(12) United States Patent
Kim et al.

(10) Patent No.: US 11,740,732 B2
(45) Date of Patent: Aug. 29, 2023

(54) ELECTRONIC DEVICE WITH DISPLAY PANEL

(71) Applicant: SAMSUNG ELECTRO-MECHANICS CO., LTD., Suwon-si (KR)

(72) Inventors: Dooil Kim, Suwon-si (KR); Sungyoul Choi, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/472,968

(22) Filed: Sep. 13, 2021

(65) Prior Publication Data

US 2022/0350456 A1 Nov. 3, 2022

(30) Foreign Application Priority Data

Apr. 29, 2021 (KR) .......................... 10-2021-0055930

(51) Int. Cl.
*G06F 3/041* (2006.01)
*G06F 3/16* (2006.01)
*H01Q 9/04* (2006.01)
*H01Q 1/24* (2006.01)

(52) U.S. Cl.
CPC .......... *G06F 3/04164* (2019.05); *G06F 3/165* (2013.01); *H01Q 1/243* (2013.01); *H01Q 9/045* (2013.01); *G06F 2203/04112* (2013.01)

(58) Field of Classification Search
CPC ............... G06F 1/1692; G06F 3/04164; G06F 2203/04112; H01Q 1/243; H01Q 9/0407; H01Q 9/045
See application file for complete search history.

(56) References Cited

U.S. PATENT DOCUMENTS

| | | | |
|---|---|---|---|
| 2016/0328057 A1* | 11/2016 | Chai | G06F 3/0412 |
| 2017/0237152 A1* | 8/2017 | Lee | G06F 1/1643 |
| | | | 343/702 |
| 2017/0285844 A1* | 10/2017 | Park | G06F 1/1647 |
| 2019/0114011 A1 | 4/2019 | Kim et al. | |
| 2021/0218834 A1* | 7/2021 | Mao | G06F 1/1626 |
| 2021/0294475 A1* | 9/2021 | Lee | G06F 1/1626 |
| 2022/0291768 A1* | 9/2022 | Gu | G06F 3/0414 |

FOREIGN PATENT DOCUMENTS

| | | | |
|---|---|---|---|
| KR | 10-2017-0112494 A | 10/2017 | |
| KR | 10-2019-0042787 A | 4/2019 | |
| KR | 10-2167154 B1 | 10/2020 | |
| WO | WO-2020022589 A1 * | 1/2020 | ........... G06F 3/0412 |

* cited by examiner

*Primary Examiner* — Priyank J Shah
(74) *Attorney, Agent, or Firm* — NSIP Law (57) ABSTRACT

An electronic device including: a display panel including a display screen to display an image; an antenna coupled to the display panel and disposed on the display screen; a touch sensor pattern separated from the antenna and disposed on the display screen; a first connecting member disposed outside the display screen of the display panel and mounted with a touch sensor driving circuit; and a second connecting member that connects the touch sensor driving circuit to the touch sensor pattern, and is at least partially more flexible than the first connecting member.

20 Claims, 8 Drawing Sheets

ELECTRONIC DEVICE WITH DISPLAY PANEL

CROSS-REFERENCE TO RELATED APPLICATION

This application claims priority to and the benefit under 35 USC 119(a) of Korean Patent Application No. 10-2021-0055930 filed in the Korean Intellectual Property Office on Apr. 29, 2021, the entire contents of which are incorporated herein by reference for all purposes.

BACKGROUND

Field

The following description relates to an electronic device with a display panel.

Description of the Background

Millimeter wave (mmWave) communication including 5th generation (5G) communication has been actively researched, and studies for commercializing/standardizing a high-frequency module for fluently realizing it are actively progressing. With the commercializing of 5G communication, the use of high-speed/high-capacity data services is further increased, the consumers who consume various image contents are increased, and the smart phone is being used as a major device for consumption of large-capacity image contents.

The display of the smart phone is not limited to the front side, but is expanded to the lateral side or to upper and lower sides and is being developed as a three- or five-sided display. Even in the situation in which most of the operation keys thereof are touch types, although button-type physical keys for power on-off and volume up-down remain on the lateral or upper side of the smart phone, as the surface on which the display is formed increases, it becomes increasingly difficult to dispose the button-type physical keys.

As the display area of the smart phone is expanded and the appearance thereof is simplified, an effort to replace such a button-type physical key is required.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an electronic device includes: a display panel including a display screen to display an image; an antenna coupled to the display panel and disposed on the display screen; a touch sensor pattern separated from the antenna and disposed on the display screen; and a first connecting member disposed outside the display screen of the display panel and mounted with a touch sensor driving circuit.

The electronic device may further include a second connecting member that connects the touch sensor driving circuit to the touch sensor pattern and at least partially more flexible than the first connecting member.

The first connecting member may include a wireless signal processing circuit, and the second connecting member may be configured to connect the wireless signal processing circuit to the antenna.

The touch sensor driving circuit may be configured to control a power on-off function or a volume up-down function.

The antenna may include an antenna patch coplanar with a surface of the display screen and a power feeding portion extending from the antenna patch, and the touch sensor pattern may surround an edge of the antenna patch.

The touch sensor pattern may be coplanar with the antenna patch.

The display panel may include a plurality of layers, and the touch sensor pattern may be coupled to the display panel.

The display panel may include a touch screen panel layer, and the touch sensor pattern may be coplanar with the touch screen panel layer, and may be separated from the touch screen panel layer and configured to be driven independently.

The display panel may include a touch screen panel layer, and the touch sensor pattern may be positioned above the touch screen panel layer.

The display panel may include an image display layer, and the touch sensor pattern may be positioned below the image display layer.

The touch sensor pattern may be adjacent to at least one edge of the display screen.

The display screen may include a front display screen and a lateral display screen oriented at different angles, and the touch sensor pattern may be disposed on the lateral display screen.

The display panel may include a flexible display panel, and the lateral display screen may be at least partially composed of a bent edge of the display panel.

The display panel may include a touch screen panel layer on the lateral display screen, and the touch sensor pattern may be coplanar with the touch screen panel layer, and may separated from the touch screen panel layer and configured to be driven independently.

The display panel may include a touch screen panel layer on the lateral display screen, and the touch sensor pattern may be disposed above the touch screen panel layer.

The display panel may include an image display layer on the lateral display screen, and the touch sensor pattern may be disposed below the image display layer.

The touch sensor pattern may have a mesh structure.

In another general aspect, a key driving module coupled to a display panel including a display screen includes: an antenna disposed on the display screen; a touch sensor pattern separated from the antenna and disposed on the display screen; a first connecting member disposed outside the display screen and mounted with a touch sensor driving circuit; and a second connecting member that connects the touch sensor driving circuit to the touch sensor pattern, and at least partially more flexible than the first connecting member.

The first connecting member may include a wireless signal processing circuit, and the second connecting member may be configured to connect the wireless signal processing circuit to the antenna.

The touch sensor driving circuit may be configured to control a power on-off function or a volume up-down function.

The antenna may include an antenna patch coplanar with a surface of the display screen and a power feeding portion extending from the antenna patch, and the touch sensor pattern may surround an edge of the antenna patch.

In another general aspect, an electronic device includes: a front display screen and a lateral display screen; an antenna disposed on one of the front display screen and the lateral display screen; a touch sensor pattern disposed on the lateral display screen; a first connecting member disposed outside the display screen and mounted with a touch sensor driving circuit; and a flexible second connecting member that connects the touch sensor driving circuit to the touch sensor pattern.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depictions of elements in the drawings may be exaggerated for clarity, illustration, and convenience.

Figure 1:
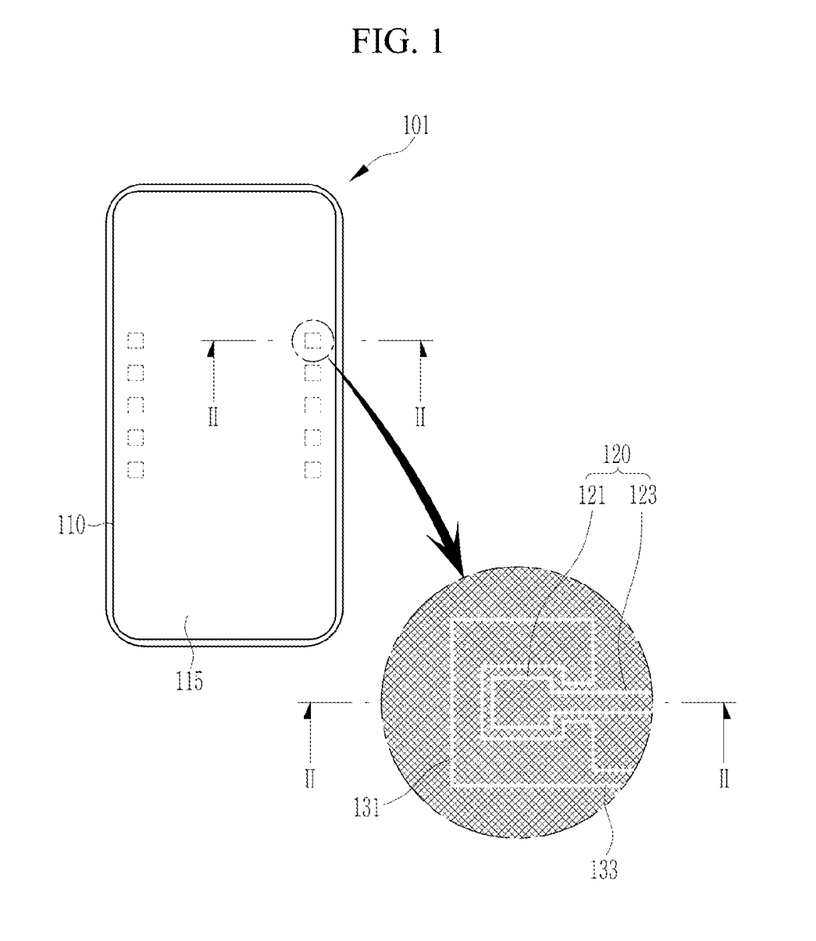
FIG. 1 illustrates a top plan view of an electronic device provided with an antenna-on-display and a touch sensor pattern according to an example.
Figure 2:
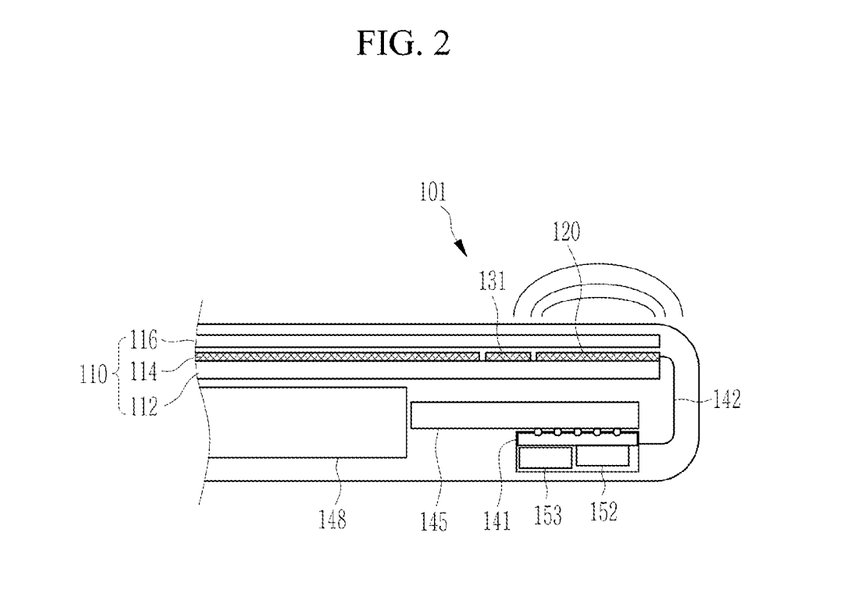
FIG. 2 illustrates a cross-sectional view taken along line II-II of FIG. 1.

FIG. 1 illustrates a top plan view of an electronic device 101 provided with an antenna-on-display and a touch sensor pattern according to an example, and FIG. 2 illustrates a cross-sectional view taken along line II-II of FIG. 1. In the present example, a mobile phone is illustrated as an example of the electronic device 101.

Referring to FIG. 1, the electronic device 101 includes a display panel 110 configured to display an image, and an antenna 120 and a touch sensor pattern 131 positioned on the display panel 110. In the display panel 110, a front side and a rear side facing opposite directions, and a lateral side connecting edges of the front and the rear may be defined. The lateral side may also include a top side facing upward and a bottom side facing downward when a state in which the user mainly uses the electronic device 101 is assumed as a reference. A display screen 115 may be formed on the front side of the display panel 110 to display an image, and an electronic component such as a driving circuit for displaying an image on the display screen 115 may be disposed on the rear surface thereof.

The antenna 120 may be coupled to the display panel 110 and positioned in the display screen 115. When the display screen 115 is positioned on the front side, the antenna 120 may be disposed adjacent to an edge of the display screen 115 positioned on the front side. A plurality of antennas 120 may be formed in pairs on left and right sides of the display screen 115, and may include a transmission (Tx) patch and a reception (Rx) patch.

The touch sensor pattern 131 may be a sensor portion of a buttonless key driving module, and may be adjacent to and separated from the antenna 120 and positioned in the display screen 115. In this case, the antenna 120 may include an antenna patch 121 having a plane parallel to a surface of the display screen 115 and a power feeding portion 123 extending from the antenna patch 121. The touch sensor pattern 131 may be configured to have a shape surrounding an edge of the antenna patch 121. The touch sensor pattern 131 may be formed as a continuous integral pattern along the edge of the antenna patch 121 while being positioned on the same plane as the antenna 120. The antenna patch 121 and the power feeding portion 123 and the touch sensor pattern 131 may be separated with gaps therebetween.

Since a shape of a wireless communication antenna is related to performance of the antenna according to a frequency, the pattern thereof is determined through simulation, while in a case of the buttonless key driving module, an area thereof may be more related to performance than the pattern of the sensor. Accordingly, the antenna 120 having the pattern determined through the simulation may be included in the area of the touch sensor pattern 131 of the buttonless key driving module.

Referring to FIG. 2, the display panel 110 may be formed to have a stacked structure including a plurality of layers. The antenna 120 and the touch sensor pattern 131 may be configured to be positioned within the stacked structure of the display panel 110.

The display panel 110 may include an image display layer 112 and a touch screen panel layer (TSP layer) 114, and may include a cover glass 116 to cover and protect the image display layer 112 and the TSP layer 114. The image display layer 112 may be variously selected according to a type of the display panel 110, and may include, for example, a liquid crystal display (LCD) or an organic light emitting diode (OLED) display. The touch screen panel layer 114, when a user presses or touches the display screen 115 with a finger or a pen, is a layer configured to recognize the position of the display screen 115 to transmit it to a system. The touch screen panel layer 114, for example, may be formed of an upper plate and a lower plate on which a transparent electrode such as an indium tin oxide (ITO) is deposited.

The antenna 120 and the touch sensor pattern 131 may be positioned on the same plane as the touch screen panel layer 114. That is, the antenna 120 may include a number of transmission (Tx) patches and reception (Rx) patches required for configuration, and in this case, the transmission/reception (Tx/Rx) patch of the antenna 120 may be disposed on the same layer as an electrode configuring the touch screen panel layer 114. In addition, the touch sensor pattern 131 may also be positioned on the same plane as the transmission/reception (Tx/Rx) patch of the antenna 120, and thus may be disposed on the same layer as the electrode configuring the touch screen panel layer 114.

The antenna 120 and the touch sensor pattern 131 may be configured to have a light-transmitting mesh structure, and for example, may be coupled to the stacked structure of the display panel 110 by applying a copper (Cu) or an aluminum (Al) alloy material. The mesh structure may include openings so that light emitted from the image display layer 112 may pass therethrough.

In this case, the touch screen panel layer 114 may be configured to have a mesh structure, and the antenna 120 and the touch sensor pattern 131 may be formed together when the touch screen panel layer 114 having the mesh structure is formed. That is, by disconnecting the connection portion of the mesh structure according to the shapes of the antenna patch 121 and the power feeding portion 123 and the touch sensor pattern 131, the antenna 120 and the touch sensor pattern 131 may be separated from the touch screen panel layer 114 and patterned. Therefore, the touch sensor pattern 131, which is the sensor portion of the buttonless key driving module, may be separated from the touch screen panel layer 114 to be independently implemented and operated.

A first connecting member 141 may be positioned on the rear side of the display panel 110, and a wireless signal processing circuit 152 and a touch sensor driving circuit 153 may be mounted on the first connecting member 141. The wireless signal processing circuit 152 may be, for example, a radio frequency integrated circuit (RFIC) chip. In addition, a second connecting member 142 for electrically connecting the first connecting member 141 and the antenna 120 and the touch sensor pattern 131 may be provided. Since the second connecting member 142 is at least partially formed to be more flexible than the first connecting member 141, it may be bent for connection. As an example, the first connecting member 141 may include a printed circuit board (PCB), and the second connecting member 142 may include a flexible printed circuit board (FPCB), as an example.

Accordingly, since the antenna 120 and the touch sensor pattern 131 are disposed toward a front direction on the front side of the display panel 110, and the wireless signal processing circuit 152 and the touch sensor driving circuit 153 are disposed on the rear side, the second connecting member 142 made of a flexible material may be bent on the lateral side of the display panel 110, and may connect the antenna 120 and the wireless signal processing circuit 152, and the touch sensor pattern 131 and the touch sensor driving circuit 153, respectively. Therefore, the antenna 120 and the touch sensor pattern 131 may be connected to the first connecting member 141 through the second connecting member 142 to have an integrated module structure that simultaneously performs an RF antenna function and a buttonless key function.

A main substrate 145 for driving the display panel 110 and the electronic device 101 including the display panel 110, and a battery 148 supplying power to the display panel 110 and the electronic device 101, may be disposed on the rear side of the display panel 110. In the main substrate 145, electronic elements required for driving the electronic device 101 may be mounted to be electrically connected to each other through circuit wires, and the first connecting member 141 may be mounted on the main substrate 145.

The antenna 120 disposed in the front side of the display panel 110 may be used as a radio frequency (RF) antenna for 5G using, for example, mmWave and Sub 6 GHz bands. As another example, the antenna 120 may be used for gesture sensing. That is, the gesture sensing antenna may be provided separately from a general communication antenna and may be connected to a gesture sensing RFIC chip (not shown), and may be configured to detect motion moving in a state spaced apart by a predetermined distance from the display screen 115 of the display panel 110 while a user is viewing an image.

The touch sensor pattern 131 may be configured with a combination of capacitance and inductance to be used as a touch sensor that performs a power on-off or volume up-down function. A signal line 133 (see FIG. 1) extending from the touch sensor pattern 131 may be connected to the touch sensor driving circuit 153 mounted on the first connecting member 141 through the second connecting member 142. The touch sensor driving circuit 153 may receive a touch signal of the touch sensor pattern 131 through the signal line 133 to control a power on-off or volume up-down operation.

The touch sensor that performs such a power on-off or volume up-down function is provided, thus it is possible to replace the existing button type of physical key, thereby omitting a convex or concave push key on the outer surface of the electronic device 101 to have an excellent appearance in design. In addition, in a state in which the display screen 115 of the electronic device 101 is extended to the edge thereof, it is possible to provide a power on-off or volume up-down touch sensor as well as a gesture sensing antenna.

The touch sensor pattern 131 may be positioned in the stacked structure of the display panel 110, but may be formed separately from the image display layer 112 and the touch screen panel layer 114 configuring the display panel 110, and may be connected to the touch sensor driving circuit 153 provided separately from circuits driving the display panel 110. Therefore, even when the display panel 110 is in an off state, the touch sensor that performs a power on-off or volume up-down function may be operated.

Hereinafter, various modified examples will be described in detail with reference to the accompanying drawings. However, redundant descriptions of the same elements as those of the example described with reference to FIGS. 1 and 2 will be omitted, and other features of respective examples will be mainly described.

Figure 3:
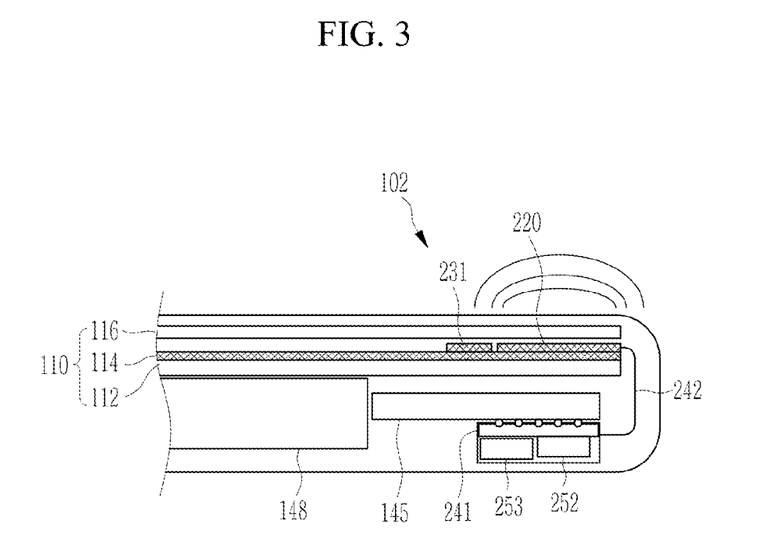
FIG. 3 illustrates a cross-sectional view of an electronic device provided with an antenna-on-display and a touch sensor pattern according to an example.

FIG. 3 illustrates a cross-sectional view of an electronic device 102 provided with an antenna-on-display and a touch sensor pattern according to an example.

Referring to FIG. 3, in the electronic device 102, a display panel 110 may be formed to have a stacked structure including a plurality of layers, and an antenna 220 and a touch sensor pattern 231 may be configured to be positioned within the stacked structure of the display panel 110. The display panel 110 may include an image display layer 112 and a touch screen panel layer 114, and may include a cover glass 116 to cover and protect them.

The antenna 220 and the touch sensor pattern 231 may be positioned on the touch screen panel layer 114. That is, on the layer on which the touch screen panel layer 114 is formed, the antenna 220 and the touch sensor pattern 231 may be stacked with an insulation layer (not shown) therebetween.

In addition, the antenna 220 and the touch sensor pattern 231 may be configured to have a light-transmitting mesh structure. The antenna 220 and the touch sensor pattern 231 are formed to have a mesh structure on the touch screen panel layer 114, and they may be patterned by disconnecting the connection portion of the mesh structure according to the shapes of the patch and feeding portion of the antenna 220 and the touch sensor pattern 231.

A first connecting member 241 may be positioned on the rear side of the display panel 110, and a wireless signal processing circuit 252 and a touch sensor driving circuit 253 may be mounted on the first connecting member 241. In addition, a second connecting member 242 for electrically connecting the first connecting member 241 and the antenna 220 and the touch sensor pattern 231 may be provided. Since the second connecting member 242 is at least partially formed to be more flexible than the first connecting member 241, it may be bent for connection.

The second connecting member 242 made of a flexible material may be bent at the lateral side of the display panel 110, may connect the antenna 220 and the wireless signal processing circuit 252, and the touch sensor pattern 231 and the touch sensor driving circuit 253, respectively. Therefore, the antenna 220 and the touch sensor pattern 231 may be connected to the first connecting member 241 through the second connecting member 242 to have an integrated module structure that simultaneously performs an RF antenna and a buttonless key function.

Figure 4:
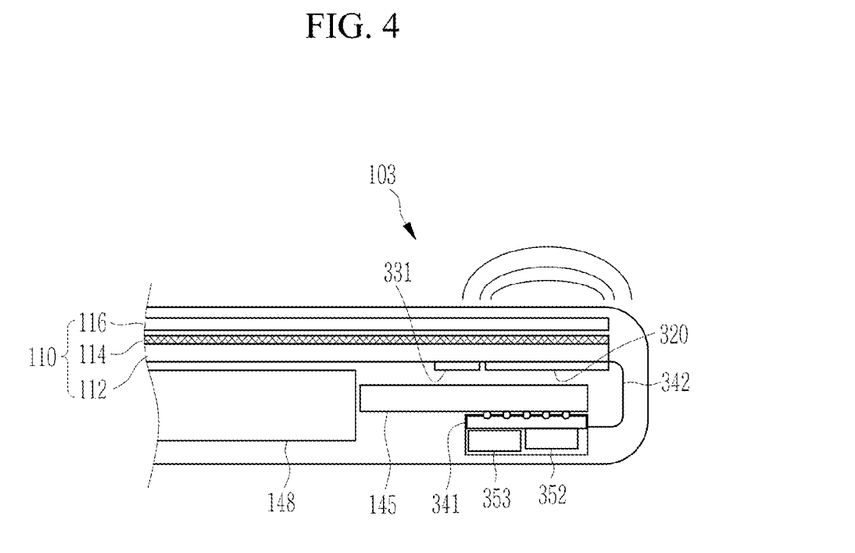
FIG. 4 illustrates a cross-sectional view of an electronic device provided with an antenna-on-display and a touch sensor pattern according to an example.

FIG. 4 illustrates a cross-sectional view of an electronic device 103 provided with an antenna-on-display and a touch sensor pattern according to an example.

Referring to FIG. 4, in the electronic device 103, a display panel 110 may be formed to have a stacked structure including a plurality of layers, and an antenna 320 and a touch sensor pattern 331 may be configured to be coupled to and positioned in the stacked structure of the display panel 110. The display panel 110 may include an image display layer 112 and a touch screen panel layer 114, and may include a cover glass 116 to cover and protect them.

The antenna 320 and the touch sensor pattern 331 may be positioned under the stacked structure of the display panel 110. That is, the antenna 320 and the touch sensor pattern 331 may be stacked under a layer on which the image display layer 112 is formed. In this case, the antenna 320 and the touch sensor pattern 331 may be configured to have a solid structure instead of a mesh structure. The antenna 320 or the touch sensor pattern 331, which has the solid structure, may have an area structure such as a polygonal shape including a rectangular and a circular shape, or a line structure. Since the antenna 320 or the touch sensor pattern 331 is positioned under the image display layer 112, they do not need to transmit an image emitted from the display panel 110.

A first connecting member 341 may be positioned on the rear side of the display panel 110, and a wireless signal processing circuit 352 and a touch sensor driving circuit 353 may be mounted on the first connecting member 341. In addition, a second connecting member 342 for electrically connecting the first connecting member 341 and the antenna 320 and the touch sensor pattern 331 may be provided. Since the second connecting member 342 is at least partially formed to be more flexible than the first connecting member 341, it may be bent for connection.

The second connecting member 342 made of a flexible material may be bent at the lateral side of the display panel 110, may connect the antenna 320 and the wireless signal processing circuit 352, and the touch sensor pattern 331 and the touch sensor driving circuit 353, respectively. Therefore, the antenna 320 and the touch sensor pattern 331 may be connected to the first connecting member 341 through the second connecting member 342 to have an integrated module structure that simultaneously performs an RF antenna and a buttonless key function.

Figure 5:
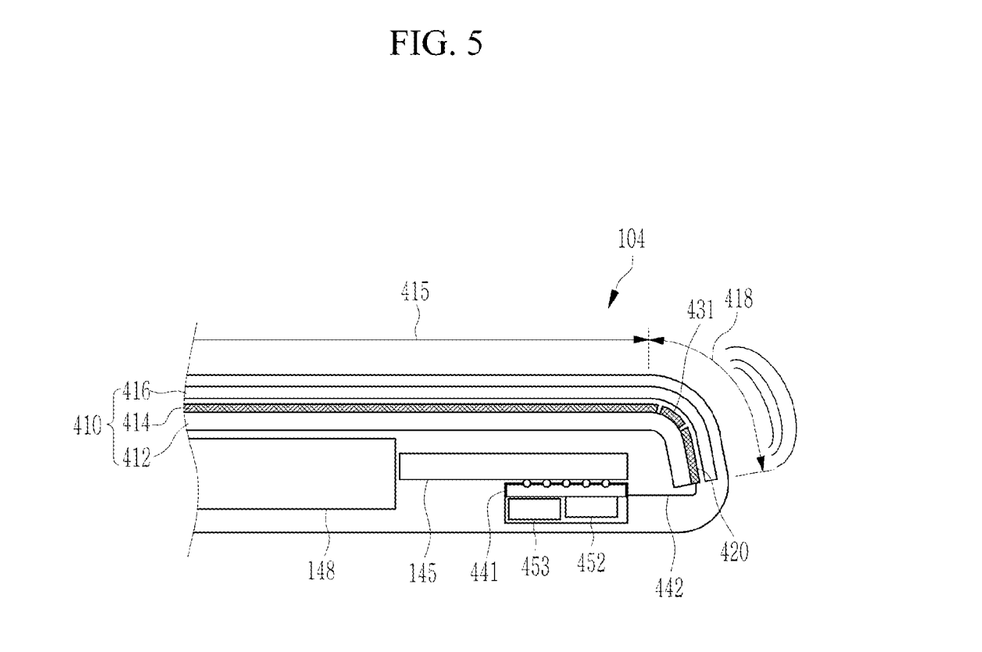
FIG. 5 illustrates a top plan view of an electronic device provided with an antenna-on-display and a touch sensor pattern according to an example.

FIG. 5 illustrates a cross-sectional view of an electronic device 104 provided with an antenna-on-display and a touch sensor pattern according to another example.

Referring to FIG. 5, in the electronic device 104, a display panel 410 includes a front display screen 415 and a lateral display screen 418 directed at different angles. The display panel 410 may include a flexible display panel, and the lateral display screen 418 may be formed while an edge of the flexible display panel is bent.

The display panel 410 may be formed to have a stacked structure including a plurality of layers, and the antenna 420 and the touch sensor pattern 431 may be configured to be positioned on the lateral display screen 418 within the stacked structure of the display panel 410. That is, the display panel 410 may include an image display layer 412 and a touch screen panel layer 414, and may include a cover glass 416 to cover and protect the image display layer 412 and the touch screen panel layer 414, and the antenna 420 and the touch sensor pattern 431 may be positioned on the same plane as the touch screen panel layer 414 in the lateral display screen 418.

The antenna 420 and the touch sensor pattern 431 may be configured to have a light-transmitting mesh structure. In this case, the touch screen panel layer 414 may also be configured to have a mesh structure, and the antenna 420 and the touch sensor pattern 431 may be formed together when the touch screen panel layer 414 having the mesh structure is formed. That is, by disconnecting the connection portion of the mesh structure according to the shapes of the patch and the power feeding portion of the antenna 420 and the touch sensor pattern 431, the antenna 420 and the touch sensor pattern 431 may be separated from the touch screen panel layer 414 and patterned.

A first connecting member 441 may be positioned on the rear side of the display panel 410, and a wireless signal processing circuit 452 and a touch sensor driving circuit 453 may be mounted on the first connecting member 441. In addition, a second connecting member 442 for electrically connecting the first connecting member 441 and the antenna 420 and the touch sensor pattern 431 may be provided. Since the second connecting member 442 is at least partially formed to be more flexible than the first connecting member 441, it may be bent for connection.

The second connecting member 442 made of a flexible material may be bent at the edge of the display panel 410, may connect the antenna 420 and the wireless signal processing circuit 452, and the touch sensor pattern 431 and the touch sensor driving circuit 453, respectively. Therefore, the antenna 420 and the touch sensor pattern 431 may be connected to the first connecting member 441 through the second connecting member 442 to have an integrated module structure that simultaneously performs an RF antenna and a buttonless key function.

As the antenna 420 and the touch sensor pattern 431 are disposed on the lateral display screen 418 of the display panel 410, the touch sensor pattern 431 may be provided at a position of a hand grip of the electronic device 104 including a smart phone. That is, a buttonless touch sensor may be disposed at a position similar to that of the hand grip of the lateral side of the smart phone electronic device 104 in which the conventional power and volume up-down buttons are provided, thereby providing convenience to a user.

Figure 6:
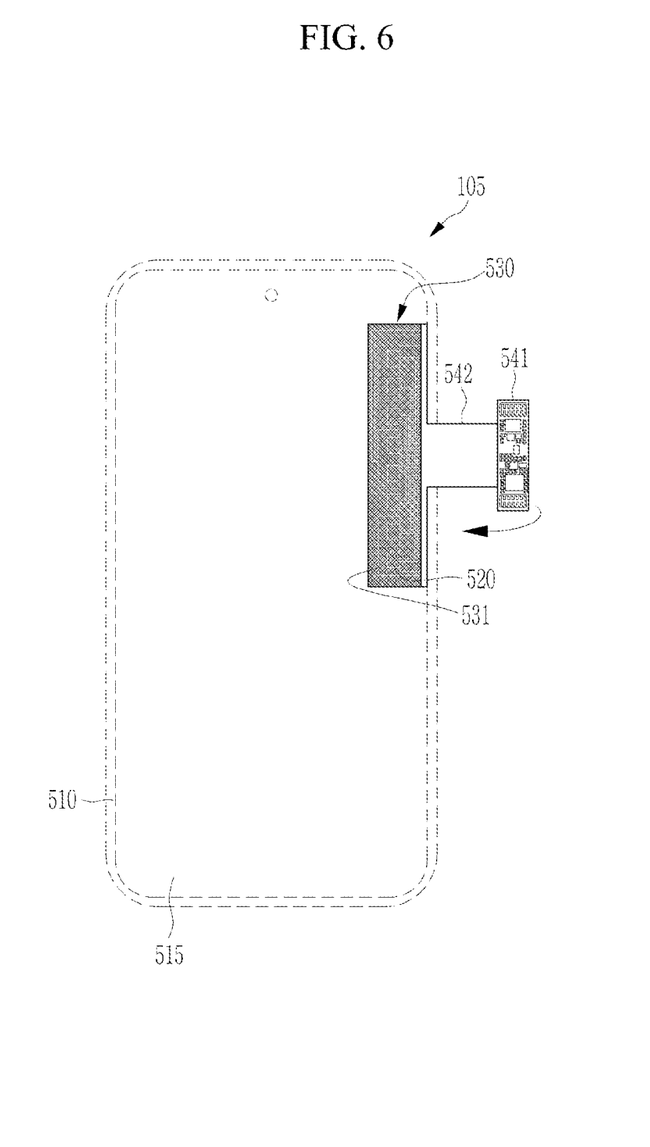
FIG. 6 illustrates a top plan view of an electronic device provided with an antenna-on-display and a touch sensor pattern according to an example.
Figure 7:
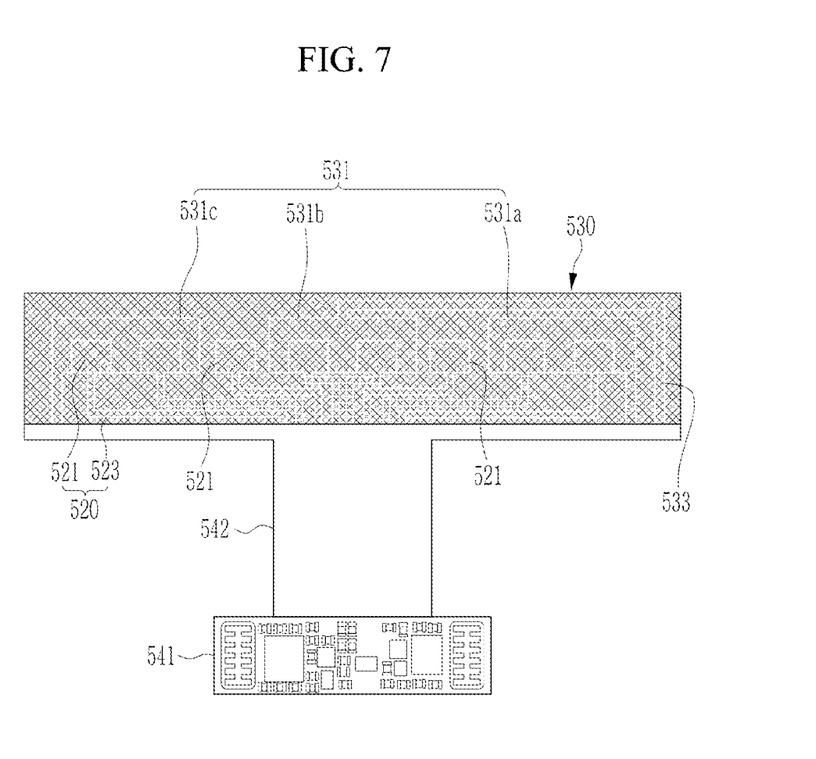
FIG. 7 illustrates a top plan view of an unfolded state of a key driving module provided with the antenna-on-display and the touch sensor pattern of the electronic device shown in FIG. 6.

FIG. 6 illustrates a top plan view of an electronic device 105 provided with an antenna-on-display and a touch sensor pattern according to an example, and FIG. 7 illustrates a top plan view of an unfolded state of a key driving module provided with the antenna-on-display and the touch sensor pattern of the electronic device shown in FIG. 6.

Referring to FIG. 6, in the electronic device 105, a plurality of antennas 520 and touch sensor patterns 531 are formed together in a stacked structure of a display panel 510 as an integrated pattern 530, and the integrated pattern 530 may be at least partially connected to a first connecting member 541 through a flexible second connecting member 542. The integrated pattern 530 may be coupled to the display panel 510 to be positioned on a display screen 515. When the display screen 515 is positioned on the front side, the integrated antenna 530 may be disposed adjacent to an edge of the display screen 515 positioned on the front side.

Referring to FIG. 7, in the integrated pattern 530, a plurality of antenna patches 521 are arranged at predetermined intervals, and the touch sensor pattern 531 may be patterned to surround edges of two selected antenna patches 521. In this case, the adjacent touch sensor patterns 531 may be spaced apart from each other, and the antenna patch 521 may be positioned between the touch sensor patterns 531 spaced apart from each other. For example, when eight antenna patches 521 are arranged at predetermined intervals from each other, touch sensor patterns 531a and 531c surrounding each pair of antenna patches 521 at both outer sides and a touch sensor pattern 531b surrounding a pair of antenna patches 521 at a center portion may be formed. In addition, one antenna patch 521 may be respectively positioned independently from the touch sensor pattern 531 between the touch sensor patterns (531, 531a, 531b, and 531c). The three touch sensor patterns 531a, 531b, and 531c formed as described above may be sensors that respectively implement functions of a power key, and a volume up-down key.

A power feeding portion 523 may extend from each antenna patch 521, and a signal line 533 may extend from each of the touch sensor patterns 531, 531a, 531b, and 531c. The feed part 523 of the antenna 520 and the signal line 533 of the touch sensor pattern 531 may be connected to each of the wires of the second connecting member 542, and the second connecting member 542 may be connected to the first connecting member 541. The power feeding portion 523 of the antenna 520 and the signal line 533 of the touch sensor pattern 531 are respectively connected by wires of the second connecting member 542, and the second connecting member 542 may be connected to the first connection member 541.

The integrated pattern 530 may be configured to have a light-transmitting mesh structure. Accordingly, the antenna 520 and the touch sensor pattern 531 may be formed together, and they may be patterned by disconnecting the connection portion of the mesh structure according to the shapes of the patch 521 and the power feeding portion 523 of the antenna and the touch sensor pattern 531.

The display panel 510 may be formed to have a stacked structure including a plurality of layers. The integrated pattern 530 may be configured to be positioned within the stacked structure of the display panel 510. The display panel 510 may include an image display layer and a touch screen panel layer, and may include a cover glass to cover and protect them. In this case, the integrated pattern 530 may be positioned on the same plane as the touch screen panel layer.

Meanwhile, as another example, the integrated pattern 530 may be stacked on the touch screen panel layer with an insulating layer (not shown) therebetween. As another example, the integrated pattern 530 may be stacked under the image display layer.

Figure 8:
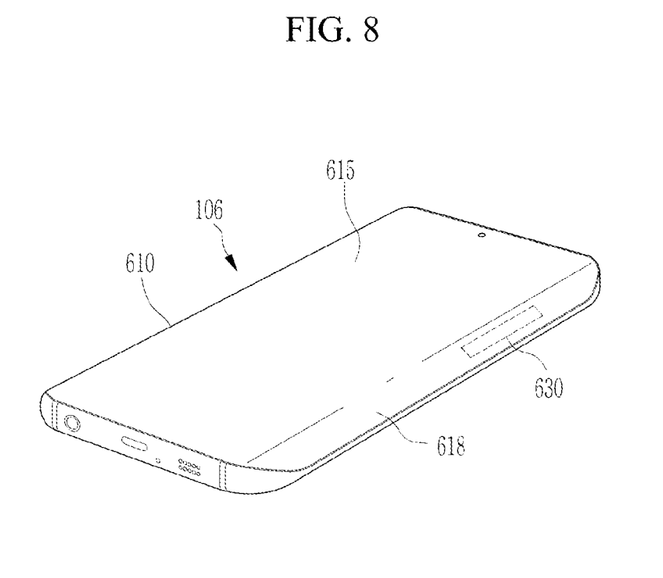
FIG. 8 illustrates a top plan view of an electronic device provided with an antenna-on-display and a touch sensor pattern according to an example.

FIG. 8 illustrates a top plan view of an electronic device 106 provided with an antenna-on-display and a touch sensor pattern according to an example.

Referring to FIG. 8, in the electronic device 106, a display panel 610 includes a front display screen 615 and a lateral display screen 618 directed at different angles. The display panel 610 may include a flexible display panel, and the lateral display screen 618 may be formed while an edge of the flexible display panel is bent.

The display panel 610 may be formed to have a stacked structure including a plurality of layers, and an integrated pattern 630 formed with a plurality of antennas and touch sensor patterns together may be positioned on the lateral display screen 618 within the stacked structure of the display panel 610. That is, the lateral display screen 618 may be stacked and positioned on the same plane as the touch screen panel layer, on the touch screen panel layer, or under the image display layer.

As the integrated pattern 630 is disposed on the lateral display screen 618 of the display panel 610, the touch sensor pattern may be provided at a position of a hand grip of the electronic device 106 including a smart phone. That is, a buttonless touch sensor may be disposed at a position similar to that of the hand grip of the lateral side of the smart phone electronic device 106 in which the conventional power and volume up-down buttons are provided, thereby providing convenience to a user.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic device comprising:
a display panel comprising a display screen configured to display an image;
an antenna coupled to the display panel and disposed on the display screen;
a touch sensor pattern separated from the antenna and disposed on the display screen; and
a first connecting member disposed outside the display screen and mounted with a touch sensor driving circuit, wherein the display panel comprises a touch screen panel layer, and
the touch sensor pattern is separated from the touch screen panel layer and configured to be driven independently.

2. The electronic device of claim 1, further comprising a second connecting member that connects the touch sensor driving circuit to the touch sensor pattern, the second connecting member being at least partially more flexible than the first connecting member.

3. The electronic device of claim 2, wherein
the first connecting member comprises a wireless signal processing circuit, and
the second connecting member is configured to connect the wireless signal processing circuit to the antenna.

4. The electronic device of claim 1, wherein
the touch sensor driving circuit is configured to control a power on-off function or a volume up-down function.

5. The electronic device of claim 1, wherein
the antenna comprises an antenna patch having coplanar with a surface of the display screen and a power feeding portion extending from the antenna patch, and
the touch sensor pattern is surrounds an edge of the antenna patch.

6. The electronic device of claim 5, wherein
the touch sensor pattern is coplanar with the antenna patch.

7. The electronic device of claim 1, wherein
the display panel comprises a plurality of layers, and
the touch sensor pattern is coupled to the display panel.

8. The electronic device of claim 7, wherein
the touch sensor pattern is planar with the touch screen panel layer.

9. The electronic device of claim 7, wherein
the touch sensor pattern is disposed above the touch screen panel layer.

10. The electronic device of claim 7, wherein
the display panel comprises an image display layer, and
the touch sensor pattern is disposed below the image display layer.

11. The electronic device of claim 1, wherein
the display screen comprises a front display screen and a lateral display screen oriented at different angles, and
the touch sensor pattern is disposed on the lateral display screen.

12. The electronic device of claim 11, wherein
the display panel comprises a flexible display panel, and
the lateral display screen is at least partially composed of a bent edge of the display panel.

13. The electronic device of claim 11, wherein
the touch screen panel layer is on the lateral display screen, and
the touch sensor pattern is coplanar with the touch screen panel layer.

14. The electronic device of claim 11, wherein
the touch screen panel layer is on the lateral display screen, and
the touch sensor pattern is disposed above the touch screen panel layer.

15. The electronic device of claim 11, wherein
the display panel comprises an image display layer on the lateral display screen, and
the touch sensor pattern is disposed below the image display layer.

16. The electronic device of claim 1, wherein
the touch sensor pattern has a mesh structure.

17. A key driving module coupled to a display panel including a display screen and a touch screen panel layer, comprising:
an antenna disposed on the display screen;

a touch sensor pattern separated from the antenna and disposed on the display screen;
a first connecting member disposed outside the display screen and mounted with a touch sensor driving circuit; and
a second connecting member that connects the touch sensor driving circuit to the touch sensor pattern, and is at least partially more flexible than the first connecting member,
wherein the touch sensor pattern is separated from the touch screen panel layer and configured to be driven independently.

18. The key driving module of claim 17, wherein
the first connecting member comprises a wireless signal processing circuit, and
the second connecting member is configured to connect the wireless signal processing circuit to the antenna.

19. The key driving module of claim 17, wherein
the touch sensor driving circuit is configured to control a power on-off function or a volume up-down function.

20. The key driving module of claim 17, wherein
the antenna comprises an antenna patch coplanar with to a surface of the display screen and a power feeding portion extending from the antenna patch, and
the touch sensor pattern surrounds an edge of the antenna patch.

* * * * *